United States Patent Office 3,342,763
Patented Sept. 19, 1967

3,342,763
BINDER FOR FIBROUS MATERIALS
Dow A. Rogers, Jr., Wilkins Township, Allegheny County, and Lawrence W. Frost, Murrysville, Pa., assignors to Westinghouse Electric Corporation, Pittsburgh, Pa., a corporation of Pennsylvania
No Drawing. Filed Apr. 19, 1963, Ser. No. 274,332
9 Claims. (Cl. 260—21)

This invention relates to electrical insulation and in particular it concerns a new binder composition for fibrous materials as well as composites of binder and fibrous materials that are useful as backing materials for insulation laminates and as covering material for electrical conductors.

Paper has long been used as a component of electrical insulation because of its low cost, good physical properties, and ease of handling. However, when it is used in equipment operating at temperatures much above 100° C., paper deteriorates rapidly and loses strength and insulating ability. It also releases gaseous decomposition products which produce voids in the surrounding insulation, thus reducing the dielectric strength, moisture resistance, and physical strength of the composite insulation.

Several other materials for use in insulation have been suggested, such as papers and fabrics made from glass or synthetic resins, and films of synthetic resin. The organic resins share to some extent the disadvantages of paper, although they frequently possess improved thermal stability. A problem often encountered with resins is lack of compatibility with other components of a composite insulation. For example, high voltage generator insulation frequently comprises a mica tape containing mica flakes, binder, and backing of paper or fabric, which is wound around the conductor to be insulated; then a low-viscosity polyester-styrene impregnating resin is used to fill the voids in the tape wrapping and provide a strong, solid composite insulation of high dielectric strength. The mica bond is generally so formulated that it dissolves in and reacts with the impregnating resin. In this system, it is desirable that the backing for the mica tape be inert to the impregating resin and of at least as good thermal stability as that resin.

Very thin glass cloth has been found to be an excellent material to use as a backing for mica tape, but it has the disadvantage of being very expensive. Glass paper is much less expensive but has the disadvantage of having very little physical strength. Unless a resinous binder is used in the paper, it has insufficient strength to hold the mica tape together during the taping operation. Many resins have been used as binders for glass paper, but most of them have been unsatisfactory for use in making mica tape for this application. Difficulties which have been encountered include lack of strength and flexibility, leaching by the impregnating resin, inhibition of the impregnating resin, poor thermal stability and liberation of gases, and lack of permeability to the impregnating resin.

It is therefore a primary object of the present invention to provide a new resinous material that can be applied to fibrous materials to produce composites outstandingly suited as electrical insulation.

Another object is to provide resin impregnated glass paper that is strong and flexible, that has good thermal stability, that does not give off gases, that is relatively inexpensive and otherwise is especially useful for electrical insulation.

Other objects will appear and be apparent from time to time in the following detailed description and discussion of the invention.

These and other objects are attained in the present invention in compositions made from partially cross-linked vegetable oil modified polyester resinous material having a functionality that is greater than two along with a cross-linking agent that will react with the polyester to produce an infusible mass. The resulting product is a thermoset resin that is particularly flexible and therefore will not detract from the flexibility of anything with which it is used, such, for example, as a thin glass paper or cloth, or a synthetic resin fiber cloth.

The polyester base material is made from a composition that includes at least one low molecular weight dihydric aliphatic alcohol, at least one low molecular weight aliphatic alcohol containing at least three hydroxyl radicals, an oil having hydroxy groups and an aromatic dicarboxylic acid. These materials are reacted with one another and the resulting resin is then combined with a suitable cross-linking agent as detailed hereinafter. These materials suitably are combined in solution form so that they can be reacted easily at elevated temperature, as well as applied easily to glass cloth, glass paper, Dacron fabric and the like.

The dihydric organic compound used in making the polyester contains from 2 to 7 carbon atoms. Typical of the materials that can be used are neopentyl glycol, trimethylene glycol, propylene glycol, butylene glycol, tetramethylene glycol, the pentanediols, the hexanediols and the like. While the amount of this dihydric organic compound used is dependent on the quantity of the other materials used and particularly the trihydric compound, generally it constitutes about 15 to 35 weight percent of the components used to make the polyester.

Representative of the organic compound containing at least three hydroxyl groups and 3 to 7 carbon atoms per molecule that can be used in the present invention are trimethylolethane, glycerol, pentaerythritol, and like aliphatic organic compounds. This reactant provides most of the excess functionality in the resulting polyester resin whereby it can be cross-linked to an infusible mass as will be pointed out hereinafter. Generally, this reactant is about 5 to 15 percent of the components used to make the polyester though it will be appreciated that as a minimum it must be present in an amount sufficient to contribute the excess functionality already noted.

The other two components used to form the oil-modified polyester base are an aromatic dicarboxylic acid and an oil. Castor oil or other oil having hydroxy groups constitutes the preferred oil that can be used and is normally present in an amount of about 20 to 40 percent of the total reactants employed to form the polyester. Isophthalic acid, phthalic acid and other dicarboxylic acid derivatives of benzene constitute the aromatic acid component for this reaction. This acid suitably comprises 40 to 65 weight percent of the total.

The intermediate oil modified partially cross-linked polyester having a functionality greater than two is formed by reacting the foregoing four components at an elevated temperature. The order of reaction of the various components is not critical. Thus, if desired, all components can be pre-mixed and then heated to cause reaction. Alternatively, the hydroxy compounds and oil can first be mixed and pre-reacted and then the acid added. In any event, the reaction mixture is heated at a temperature on the order of about 150° to 300° C. for a period extending from 2 to 20 hours or more. At these conditions, the dihydric component is quite volatile. Accordingly, some of it may be lost but this loss can be minimized by adding to the reaction mixture xylene or similar material. If desired, the mixture can be heated with the temperature of the reaction mass being permitted to rise as the reaction proceeds. For example, the reaction mix can first be heated for about one to four hours at about 200° C. Then the temperature can be raised about 20° C. and the reaction mixture heated at that temperature for an additional hour. Finally, heating for about two to three hours at the still higher temperature of about 250° will insure sufficient reaction. Pressure, catalysts and the like are not essential in producing this resin which generally is a semi-solid, clear or clear-amber resin having an acid member below about 50 and having a softening point on the order of about 35° to 60° C.

The resin thus produced is the partially cross-linked polyester. All of the functional sites have not been reacted, however, and the resin is not fully thermoset at this time. To produce a varnish in accordance with this invention, this resin is reacted with a cross-linking agent, such as a silicone intermediate, e.g., partially hydrolyzed alkoxy alkyl or alkoxy aryl silanes alkoxy alkylaryl silanes and mixtures thereof; for instance, the hydrolysis product of dimethoxymethylphenylsilane, and diethoxymethylphenylsilane or the like. Generically, the resulting reactive silicone intermediate is a mixture of compounds having the formula

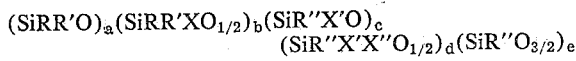

where R, R', and R'' may be the same of different and are chosen from the group consisting of alkyl, aryl, alkylaryl and aralkyl radicals, such as ethyl, tolyl, benzyl and naphthyl radicals, with methyl and phenyl being preferred; X, X' and X'' may be the same or different and are chosen from the group consisting of halogen (e.g., chlorine), alkoxy, aroxy and hydroxy radicals with alkoxy such as ethoxy and methoxy, and hydroxy being preferred; $a$, $b$, $c$, $d$, and $e$ are integers from 0 to 10 with $a+b+c+d+e+$ equaling 2 to 12, preferably 2 to 5, and $b+d$ equal to $e+2$. Such products are commercially available. We have used Sylkyd 50 (Dow Corning) which is a methoxylated partial hydrolysate of monophenyl and phenylmethyl silanes. It can be represented by the average chemical formula: trimethoxydimethyltriphenyltrisiloxane. A butylated melamine-formaldehyde condensation product also can serve as the cross-linking component.

We have used Resimene 882 (Monsanto Chemical Co.), a commercially available butylated melamine-formaldehyde, as the cross-linking component. The quantity of the cross-linking agent suitably is that which is clearly sufficient to completely cross-link the polyester by reaction of the hydroxy or alkoxy groups with the relative groups in the polyesters, and generally about 0.1 to 15 parts of cross-linking agent are used for each 10 parts of the polyester base resin. The cross-linking agent and the polyester are heated together for a period of from about 10 minutes to 2 hours or more at a temperature of from about 150° to 225° C. The resulting product is then dissolved in Cellosolve, toluene, xylene, or like organic solvent therefor, as well as mixtures thereof, to produce a varnish. This varnish is used to impregnate glass cloth, glass paper, Dacron fabric and the like and the coated carrier is then cured by heating it to a temperature of about 150° to 250° C. for 5 to 25 hours or more, to produce suitable materials for insulation in accordance with this invention. The polyester resin and cross-linking agent can also be combined in solution form, applied to the material to be coated, and all curing or reaction of those components can be accomplished in its final form.

The silicone intermediate is readily obtained by heating a mixture of a suitable silane or mixtures thereof, e.g., diethoxymethylphenylsilane, with a small amount of water, that is about 0.02 to 0.3 part per part of the silane, in the presence of a mineral acid, such as hydrochloric acid, sulfuric acid or the like as a catalyst. Such liquid silicones are available commercially. The butylated melamine-formaldehyde resin is likewise commercially available. A typical product that can be used is obtained by reacting melamine with formaldehyde in a ratio of about 5 to 6 mols of formaldehyde per mol of melamine followed by butylization with butyl alcohol. An excess of butanol can be used, and it is suitably activated slightly, as with a mineral acid, to speed the reaction. In the reaction product, generally about 1 to 2 mols of butanol are present per mol of melamine.

The invention will be described further in conjunction with the following examples in which the details are given by way of illustration and not by way of limitation.

*Example I*

In this example, 699 grams of 2,2-dimethylpropanediol-1,3, 294 grams of trimethylolethane and 747 grams of castor oil were mixed and heated to 175° C. Then 1328 grams of isophthalic acid were added, together with about 50 ml. of xylene, while the mixture was stirred rapidly. Heating and stirring were continued for 8 hours at 220° C. and 5 hours in the temperature range of 230° to 250° C. A modified Dean-Stark trap was used to remove the water produced and return the xylene to the reaction vessel. At the end of the run, it was found that 290 grams of water had been collected, together with 133 grams of neopentyl glycol. The resin remaining in the flask was a clear amber semi-solid, having an acid number of 9.

A solution in xylene was prepared from 380 grams of the resin and 31.8 grams of a 63 percent solution in xylene of butylated melamine-formaldehyde resin (Resimene 882, Monsanto Chemical Co.). In the data hereinafter, this is indicated as varnish No. 1.

Varnish No. 2 was prepared using 392 grams of the above clear amber resin and 12.7 grams of the 63 percent xylene solution of the butylated melamine-formaldehyde resin.

Varnish No. 3 was prepared by mixing 320 grams of the clear amber semi-solid resin obtained in Example I with 80 grams of a silicone intermediate (Sylkyd 50, Dow Corning Corp.). This mixture was heated and stirred while sparging slowly with nitrogen. After holding the mixture in the temperature range of about 180° to 190° C. for 40 minutes, the resultant viscous product was dissolved in Cellosolve to give a clear varnish.

*Example II*

Neopentyl glycol, in the amount of 1030 grams, along with 540 grams of trimethylolethane, 1400 grams of castor oil and 2490 grams of isophthalic acid were mixed together and heated for 4.5 hours at 210° to 240° C. with stirring and nitrogen sparging, using an air-cooled reflux condenser. At the end of this period, a clear resin was obtained having an acid number of 38 and weighing 4930 grams. The resin was cooled to 170° C. and 1230 grams of the silicone intermediate (Sylkyd 50) were added. This mixture was heated for one hour at 160° to 180° C., and was then dissolved in a 2:1 (by weight) mixture of xylene and Cellosolve.

*Example III*

A silicone intermediate, used as the crosslinking agent, was prepared as follows: About 35 grams of water, 1.6 grams of concentrated hydrochloric acid and 630 grams of diethoxymethylphenylsilane was placed in an open-topped vessel. The mixture was stirred and heated slowly to 130° C. while permitting volatiles to escape. At the end of one hour, a liquid product weighing 483 grams was recovered.

*Example IV*

About 107 grams of neopentyl glycol. 45 grams of trimethylolethane, 115 grams of castor oil and 204 grams of isophthalic acid were mixed with a small amount of xylene and heated azeotropically (with the modified Dean-Stark trap) for three hours at 200°–210° C., one hour at 220–230° C., and two hours at 230°-240° C. A clear resin was obtained, acid No. 16.

98 grams of the silicone intermediate of Example III was added, and heating was continued with nitrogen sparging at 200° C. for 30 minutes. The viscous resin obtained was dissolved in xylene and then filtered to give a clear solution containing 460 grams of resin solids. To this, 23 grams of a 63 percent xylene solution of the butylated melamine-formaldehyde resin (Resimene 882) were added to produce a varnish, which had a viscosity of Gardner U–V at 50 percent solids. This is varnish No. 4 in the following data.

The varnishes were applied to glass cloth and the products obtained were tested for the properties of interest. Thermal stability test specimens were made by dip-coating strips of glass cloth, 6″ x 2½″ x 0.005 inch, with the varnish to be tested. The dip-coated strip was cured for 2 hours at 150° C.; dipped again and then cured by heating at 150° C. for 16 hours. The viscosity of each varnish used was adjusted to give a final thickness of the double dip-coated varnished cloth of about 7 to 8 mils. Separate specimens of each of these varnished cloths were then aged in air, in forced-draft ovens heated at the temperatures of 175° C., 200° C., 225° C. and 250° C. Periodically, the specimens were removed from the ovens and subjected to a dielectric stress of 6 kv., applied to opposite sides of the specimen by ¼ inch diameter flat-ended electrodes. If the specimen tested did not break down, it would be returned to the oven. If failure occurred, the test was repeated at a new location on the varnished cloth. This was repeated until the sample passed the test or failed at four different locations. When the accumulated total of failures for a given specimen reached four, the varnish was considered to have failed at that temperature. The data obtained, i.e., time to failure, are set forth in Table I.

TABLE I

| Varnish No. | Hours Life at Temperature (° C.) | | | |
|---|---|---|---|---|
| | 250 | 225 | 200 | 175 |
| 1 | 240 | 1,140 | 4,116 | >9,700 |
| 2 | 360 | 1,092 | 4,116 | >9,700 |
| 3 | 300 | 1,008 | 3,684 | >9,700 |

A commercial organic resin was also run as a standard, in the foregoing thermal stability test, at temperatures of 225°, 200° and 175° C., and had life durations in hours of 216, 846 and 4600. Thus, the above data demonstrate the marked superiority of varnishes of the present invention.

Other tests were conducted as follows: Samples of 0.0023-inch thick glass paper were varnished by dip-coating them in the various varnishes and then curing at 150° C. for 16 hours. The treated samples were then immersed in a standard impregnating resin used for high voltage apparatus, and the resulting products were aged for 24 hours at room temperature. For control purposes, an unvarnished glass paper was similarly immersed in the impregnating resin, cured and tested. This test was used to determine the inhibition to gelling imparted by the varnish. Accordingly, the gel times in each instance were noted. The tensile breaking strength of the treated glass papers was also determined. These data are:

TABLE II

| Varnish No. | Gel Time at 90° C.; Min.+Sec. | Tensile Breaking Strength |
|---|---|---|
| 1 | 6+15 | 1,428 |
| 2 | 6+30 | 764 |
| 3 | 6+30 | 2,750 |
| 4 | 6+18 | 2,250 |
| Impregnating Resin Only | 6+30 | |

These data demonstrate that the varnishes of the invention in no manner inhibit the gelling of standard impregnating resins. Moreover, papers treated therewith have adequate tensile breaking strength, and are flexible. For example, a glass paper treated with varnish No. 3 was subjected to a tensile strength measurement and showed a strength of about 8 to 9 times that of the untreated glass paper.

From the foregoing discussion and description, it is evident that the present invention provides a highly effective material for treating glass paper and the like backing materials that can be used with electrical insulation without adversely affecting that insulation. The products obtained are flexible, will not cause destruction of the conventional resin impregnants used therewith, will not interfere with the gelling of those resins, and yet are strong and inexpensive.

Unless otherwise indicated or apparent, all percentages given in the foregoing specification are by weight.

While the invention has been described with reference to specific materials, conditions and the like, it should be noted that changes, substitutions, and variations can be made without departing from its scope.

We claim:

1. A binder composition for use in forming insulating backing tapes consisting essentially of a partially cross-linked, oil-modified polyester resinous material having a functionality greater than two comprising the reaction product of, in parts by weight, about 15 to 35 parts of at least one dihydric aliphatic alcohol containing 2 to 7 carbon atoms per molecule, about 5 to 15 parts of at least one aliphatic alcohol containing at least three hydroxyl radicals and 3 to 7 carbon atoms per molecule, about 20 to 40 parts of a vegetable oil, and about 40 to 65 parts of a dicarboxylic acid derivative of benzene, and at least one cross-linking agent selected from the group consisting of (A) a partially hydrolyzed substituted alkoxy silane in which the substituents are selected from the group consisting of alkyl, aryl, alkylaryl and aralkyl radicals and (B) butylated melamine-formaldehyde resins, about 0.1 to 15 parts of the cross-linking agent being present for each 10 parts of the polyester.

2. The binder composition of claim 1 in which the cross-linking agent is selected from the group consisting of a partially hydrolyzed substituted alkoxy silane in which the substituents are selected from the group consisting of alkyl, aryl, alkylaryl and aralkyl radicals and mixtures of such silanes.

3. The binder composition of claim 1 in which the cross-linking agent is a butylated melamine-formaldehyde resin.

4. A flexible insulation tape comprising thin flexible fibrous material coated with a binder composition in accordance with claim 1, the binder coating having been heated to convert it to an infusible mass.

5. A binder composition for use in forming insulating backing tapes consisting essentially of a partially cross-linked, oil-modified polyester resinous material having a functionality greater than two comprising the reaction product, in parts by weight, of about 15 to 35 parts of neopentyl glycol, about 5 to 15 parts of trimethylolethane, about 20 to 40 parts of castor oil, and about 40 to 65 parts of isophthalic acid, and about 0.1 to 15 parts of at least one member selected from the group consisting of (A) a partially hydrolyzed substituted alkoxy silane in which the substituents are selected from the group consisting of alkyl, aryl, alkylaryl and aralkyl radicals and (B) butylated melamine-formaldehyde resins for each 10 parts of the polyester.

6. The binder composition of claim 5 in which the member is a silane represented by the average chemical formula trimethoxydimethyltriphenyltrisiloxane.

7. A flexible insulation tape comprising thin flexible glass paper coated with a binder composition in accordance with claim 6.

8. A flexible insulation tape comprising thin flexible fibrous material coated with a binder composition in accordance with claim 5, the binder coating having been heated to convert it to an infusible mass.

9. The flexible insulation tape of claim 8 in which the fibrous material is glass paper.

References Cited

UNITED STATES PATENTS

| | | | |
|---|---|---|---|
| 2,632,744 | 3/1953 | Howald | 162—167 |
| 2,937,230 | 5/1960 | Rogers | 260—22 |
| 2,945,829 | 7/1960 | Frost et al. | 260—21 |
| 2,973,331 | 2/1961 | Kraft | 260—22 |
| 2,990,307 | 6/1961 | Stalego | 260—850 |
| 3,023,177 | 2/1962 | Boucher | 260—21 |
| 3,039,979 | 6/1962 | Carlick et al. | 260—21 |
| 3,057,824 | 10/1962 | Le Bras et al. | 260—22 |
| 3,081,195 | 3/1963 | Biefeld et al. | 117—126 |
| 3,133,032 | 5/1964 | Jen et al. | 260—21 |
| 3,162,616 | 12/1964 | Dombrow et al. | 260—22 |
| 3,192,089 | 6/1965 | Clark | 117—126 |
| 3,223,658 | 12/1965 | Kraft et al. | 260—22 |

OTHER REFERENCES

Dow Corning Silicone Notes, Reference 7–701, October 1957, Subject: Sylkyd 50, Dow Corning Corporation.

DONALD E. CZAJA, *Primary Examiner.*

LEON J. BERCOVITZ, *Examiner.*

R. W. GRIFFIN, *Assistant Examiner.*